United States Patent
Yang

(10) Patent No.: US 11,233,971 B2
(45) Date of Patent: Jan. 25, 2022

(54) METHOD AND APPARATUS FOR DIGITAL DATA TRANSMISSION BASED ON AN ANALOG COMPOSITE VIDEO SIGNAL

(71) Applicant: Wuxi Vimicro Corporation, Jiangsu (CN)

(72) Inventor: Xiaodong Yang, Jiangsu (CN)

(73) Assignee: Nanjing Zgmicro Company Limited, Jiangsu (CN)

(*) Notice: Subject to any disclaimer, the term of this patent is extended or adjusted under 35 U.S.C. 154(b) by 125 days.

(21) Appl. No.: 15/451,193

(22) Filed: Mar. 6, 2017

(65) Prior Publication Data

US 2017/0180677 A1 Jun. 22, 2017

Related U.S. Application Data

(63) Continuation of application No. PCT/CN2015/079966, filed on May 27, 2015.

(51) Int. Cl.
| | |
|---|---|
| *H04N 7/18* | (2006.01) |
| *H04N 7/10* | (2006.01) |
| *H04N 5/265* | (2006.01) |
| *H04N 7/015* | (2006.01) |

(52) U.S. Cl.
CPC .......... *H04N 7/10* (2013.01); *H04N 5/265* (2013.01); *H04N 7/181* (2013.01); *H04N 7/183* (2013.01); *H04N 7/015* (2013.01); *H04N 7/106* (2013.01)

(58) Field of Classification Search
CPC .......... H04N 7/10; H04N 7/181; H04N 5/265; H04N 7/183; H04N 7/015
USPC ....................................................... 348/143
See application file for complete search history.

(56) References Cited

U.S. PATENT DOCUMENTS

| | | | | |
|---|---|---|---|---|
| 5,809,270 A | * | 9/1998 | Robbins ............... | G06F 9/3867 712/200 |
| 7,187,418 B2 | * | 3/2007 | Phillips ................. | H04L 63/02 348/565 |
| 2004/0045039 A1 | * | 3/2004 | Harrison ............ | H04N 21/4782 725/133 |
| 2004/0221143 A1 | * | 11/2004 | Wise ................... | G06F 12/0207 712/300 |
| 2011/0072471 A1 | * | 3/2011 | Battas ................ | H04N 7/17327 725/67 |
| 2012/0272117 A1 | * | 10/2012 | Stadelmeier ............ | H04L 1/008 714/752 |

(Continued)

OTHER PUBLICATIONS

Lubobya et al, Performance comparisons of wireless Mesh IP video surveillance models (Year: 2015).*

*Primary Examiner* — Shan E Elahi
(74) *Attorney, Agent, or Firm* — Joe Zheng

(57) ABSTRACT

Techniques pertaining to the transmission of digital data via a conventional transmission medium (e.g., a coaxial cable for TV) specifically for analog composite video signals are disclosed. To retrofit in an existing system not designed for transmitting digital signals or data, the techniques are provided to convert the data into an analog signal that is transmitted over a coaxial cable, where the analog signal, when received, is decomposed to recover the data. According to one aspect of the present invention, videos in high quality (e.g. high definition or HD format) from HD cameras are used in the conventional surveillance system, where the transmission medium for the analogy videos is already installed.

30 Claims, 3 Drawing Sheets

(56) References Cited

U.S. PATENT DOCUMENTS

2014/0198846 A1\* 7/2014 Guo ................. H04N 19/30
375/240.12

\* cited by examiner

METHOD AND APPARATUS FOR DIGITAL DATA TRANSMISSION BASED ON AN ANALOG COMPOSITE VIDEO SIGNAL

BACKGROUND OF THE INVENTION

1. Field of the Invention

The present invention relates to the field of electronic surveillance, and in particular, to a method and an apparatus for digital data transmission based on an analog composite video signal.

2. Description of Related Art

Video surveillance systems have been widely used in various areas of social life. A video surveillance system generally includes a front-end camera, a transmission cable and a video surveillance platform. The camera transmits a video signal to a digital video recorder (DVR) or a network video recorder (NVR) coupled to the video surveillance platform via a network cable or a coaxial cable. The surveillance platform allocates the video signal to one or more monitors for display and one or more video recording devices for storage.

The video surveillance technologies are moving towards high definition. The high definition was initially proposed for broadcasting and television. There are standard definition (SD), high definition (HD) and full high definition (full HD) in the broadcasting and television field. The SD is a video format having a video vertical resolution less than 720p which is a progressive video signal format with 720 scanning lines. The HD is a video format having a video vertical resolution exceeding 720p or 1080i which is an interlaced video signal format with 1080 scanning lines. The full HD is a video format having a video vertical resolution up to 1080p, which is a progressive video signal format with 1080 scanning lines and has a resolution of 1920×1080. It should be noted that the meaning of "HD" generally refers to a video format having the video vertical resolution equal to or higher than 720p. The traditional HD, the full HD and other video formats satisfied above requirement are referred to herein as HD collectively. Depending on many elements, it is not easy for a video surveillance system to support the HD video signal.

The front-end camera for taking pictures of a monitored scene includes an analog camera (e.g., CCTV camera) and a network digital camera (e.g., IP camera). The analog camera is very easy to use and install. However, a current trend of the front-end camera has already been in digital and networked in order to view in a long distance and operate easily.

FIG. 1 is a schematic diagram showing a conventional topological structure of a video surveillance system including an analog camera, a DVR, and one or more displays. FIG. 2 is a schematic diagram showing a conventional topological structure of the video surveillance system including a network camera, an NVR and one or more displays. When a surveillance video signal is received by the DVR or the NVR, the surveillance video signal is transmitted by the DVR or the NVR via an ethernet network. Hence, the functions of the DVR and the NVR are similar from this point of view. The key difference between the DVR and the NVR is how to connect with the front-end camera and where the surveillance video signal is compressed.

The video surveillance system based on the analog CCTV camera and the DVR shown in FIG. 1 is commonly used since it is relatively easy to install and maintain. One end of a coaxial cable is inserted into the CCTV camera, the other end of the coaxial cable is inserted into the DVR, and then a video surveillance system is installed. However, a video resolution of the analog camera is limited. The analog camera transmits a video signal via a coaxial cable. The video signal transmitted on the coaxial cable is a composite video signal in a National Television System Committee (NTSC) format or a Phase Alternating Line (PAL) format, which can support a video resolution of 704*576 in general and is expanded to support the video resolution of 960*576 (960H) recently. However, there is a demanding need for video surveillance system of higher video resolution, e.g., 1280*720 (720p), 1920*1080 (1080p) and etc. Not only no current video transmission standard supports a high definition analog video signal in conventional technologies at present, but also there are several serious challenges in transmitting high definition video. One of the challenges is that the video signal would be seriously attenuated when the video signal is transmitted in a long distance. If no repeater is used, it is very difficult to transmit the high definition video signal in a long distance, e.g., above 300 meters.

A combination of the IP camera and the NVR is better for the high definition video surveillance system because an IP network acts as a transmission medium between the IP camera and the NVR. However, installation and maintenance of the IP camera and the NVR is more complex relative to a plug-and-play installation of the DVR and the analog camera because an operation of the IP camera and the NVR needs network management and a repeater. Furthermore, it is a huge challenge for a user to maintain an unmanaged network to run steadily for a long time, e.g., above 1 year. Although a market share of the video surveillance systems with IP cameras+the NVR has increased rapidly in recent years, there are still many demands for the video surveillance system based on the DVR and the analog camera in many situations.

Therefore, it is necessary to provide an improved technical solution to solve the above problems.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to the transmission of digital via a conventional transmission medium (e.g., a coaxial cable for TV) specifically for analog composite video signals. To retrofit in an existing system not suitable or designed for transmitting digital signals or data, a technique is provided to convert the data into an analog signal that is transmitted over a coaxial cable, where the analog signal is decomposed, when received, to recover the data. According to one aspect of the present invention, videos in high quality (e.g. high definition or HD format) are used in the conventional surveillance system, where the transmission medium for the analogy videos is already installed.

According to another aspect of the present invention, a video stream is packaged into a plurality of data sets to form video data. Each data set is mapped into brightness data or/and chrominance data for each pixel in a group having N neighboring pixels in a horizontal scanning line, wherein N is an integer greater than or equal to 1. From another perspective, the video data includes a plurality of horizontal scanning lines, each horizontal scanning line including a plurality of pixels, each pixel representing brightness data or/and the chrominance data.

According to yet another aspect of the present invention, each of the pixels is represented by an X-bit binary sequence representing the brightness data or/and the chrominance data, and each data set of the digital data stream is a Y-bit binary sequence. A process is designed to map the data set into high Y bits of the X-bit binary sequence, and further map a preset X-Y bit binary sequence into low X-Y bits of the X-bit binary sequence, where X and Y are positive integers, Y is less than X, N is greater than or equal to 4, X is greater than or equal to 8, and Y is greater than or equal to 2.

The present invention may be implemented in a method, an apparatus, a device or a part of a system. Different implementations yield different benefits, advantages and objectives. According to one embodiment, the present invention is an apparatus for transmitting data via a composite video signal. The apparatus comprises: a mapping unit for mapping a digital data stream provided by a digital data source into video data, wherein the video data is used to synthesize the composite video signal. The apparatus further comprises a composite video signal encoder for receiving the video data and forming the composite video signal based on the video data according to a predetermined composite video format; and a composite video transmission interface for sending the analog composite video signal over a conventional transmission medium suitable for transmitting the composite video signal.

According to another embodiment, the present invention is an apparatus for receiving data transmitted via a composite video signal. The apparatus comprises: a composite video transmission interface for receiving the composite video signal from a conventional transmission medium not suitable for transmitting digital video signal in HD format; a composite video signal decoder for decoding the composite video signal according to a predetermined composite video format to obtain video data; and a data extraction unit for extracting a digital data stream from the video data, wherein the digital data stream is mapped into the video data before the composite video signal is received in the composite video transmission interface.

According to still another embodiment, the present invention is a method for transmitting data via a composite video signal. The method comprises: mapping a digital data stream provided by a digital data source into video data; generating the composite video signal based on the video data, wherein the video data is used to synthesize the composite video signal according to a predetermined composite video format; and transferring the composite video signal over a conventional transmission medium suitable for transmitting the composite video signal.

According to yet another embodiment, the present invention is a method for receiving data transmitted via a composite video signal. The method comprises: receiving the composite video signal from a conventional transmission medium not suitable for transmitting digital video signal in HD format; decoding the composite video signal according to a predetermined composite video format to obtain video data; and extracting a digital data stream from the video data, wherein the digital data stream is mapped into the video data before the composite video signal is received.

Many objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

In the following, the particular embodiments of the invention will be described in detail in connection with the drawings. One of objects, features, and advantages of the present invention is that a conventional composite video interface and a composite video transmission channel can be utilized to transmit a HD digital video data directly by disguising the HD digital video data as a conventional composite video signal.

Figure 1:
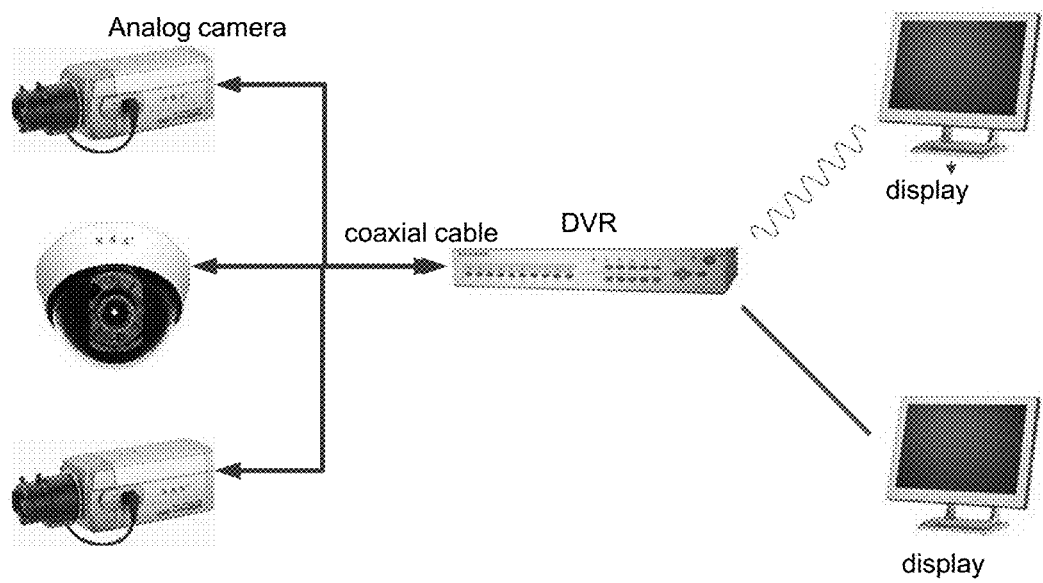
FIG. 1 is a schematic diagram showing a conventional topological structure of a video surveillance system comprising an analog camera and a DVR.
Figure 2:
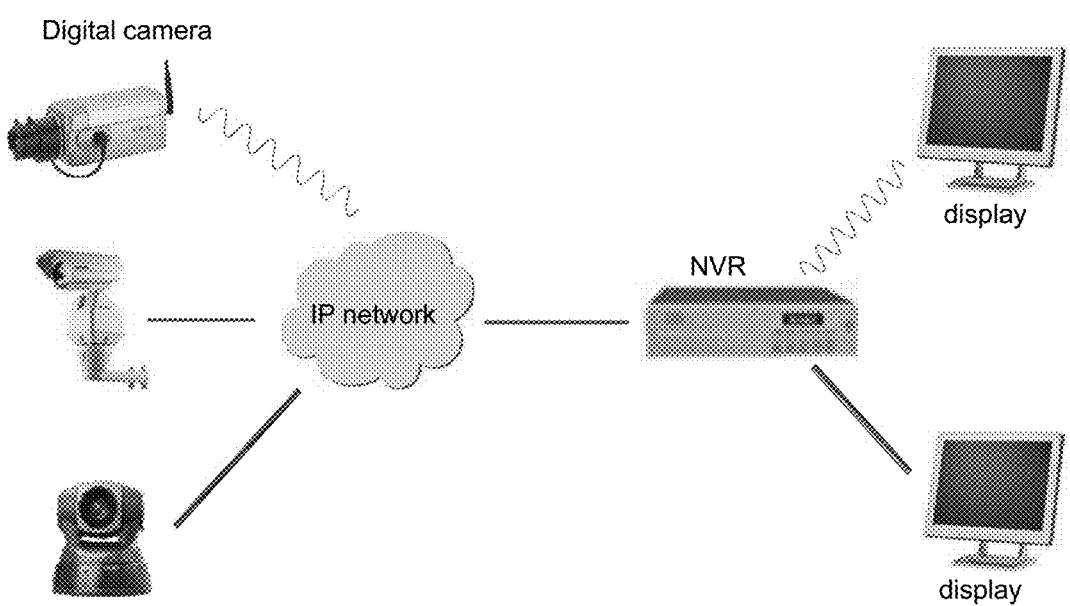
FIG. 2 is a schematic diagram showing a conventional topological structure of a video surveillance system comprising a network camera and a NVR.
Figure 3:
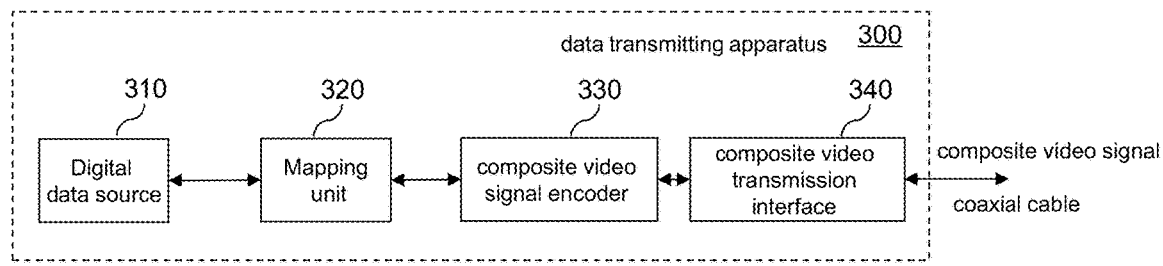
FIG. 3 is a block diagram showing a data transmitting apparatus according to one embodiment of the present invention.

Referring to FIG. 3, it shows a block diagram showing a data transmitting apparatus 300 according to one embodiment of the present invention. The data transmitting apparatus 300 is designed for transmitting a digital data based on a composite video signal. The data transmitting apparatus 300 comprises a digital data source 310, a mapping unit 320, a composite video signal encoder 330 and a composite video transmission interface 340.

The digital data source 310 provides a digital data stream. As the name suggests, a digital data stream is a set of one or more digital video data, digital audio data and other types of digital data (e.g., control signal or a surveillance alarm signal). In one embodiment, the data transmitting apparatus 300 can support any type of digital data stream.

According to one embodiment, the digital data source 310 includes a video capture unit (not shown) and a video compression unit (not shown). The video capture unit is provided to take pictures of a monitored scene so as to obtain digital video data in HD format (e.g., having a video vertical resolution of 720p and more). The video compression unit adopts one of many conventional video compressing standards, e.g., H.263, MPEG2, H.265, etc., to compress the digital video data to obtain compressed digital video data or a stream. Accordingly, the digital data source 310 provides or produces a compressed digital video source or stream.

In one embodiment, the digital data source 310 further comprises an audio acquisition unit (not shown) and an audio encoder unit (not shown). The audio acquisition unit is provided to acquire audio signals and produce digital audio data. The audio encoder unit is configured to compress the acquired digital audio data to get a compressed digital audio source data or stream. In this embodiment, the digital data stream provided by the digital data source 310 not only comprises the compressed digital video source data, but also comprises the compressed digital audio source data.

As a well-known technique, a composite video signal, also called as CVBS representing Color, Video, Blanking, Sync, or also called as a composite video baseband signal, comprises a brightness signal, a chrominance signal, a field synchronization signal, a row synchronization signal, and a row and field blanking signal, etc. For simplicity, in the present invention, the signals, such as the field synchronization signal, the row synchronization signal, the row and field blanking signal, etc., in the CVBS except for the brightness signal and the chrominance signal are collectively called as a synchronization signal. Thus a composite video signal composites a brightness signal, a chrominance signal and a synchronization signal into one signal channel for transmission. Namely, the chrominance signal and the brightness signal are synthesized into one composite video signal before being transferred, and the composite video signal is separated to obtain the chrominance signal and the brightness signal after being received.

The mapping unit 320 is provided to map a digital data stream provided by the digital data source 310 into brightness data or chrominance data used to synthesize a composite video signal (CVBS). The brightness data and the chrominance data are collectively called video data. The digital data stream provided by the digital data source is packaged into a plurality of data sets. The video data used to synthesize the composite video signal comprises a plurality of horizontal scanning lines, where each horizontal scanning line includes a plurality of pixels. Each pixel is represented by corresponding a set of brightness data or/and chrominance data. The mapping unit 320 maps each data set (the brightness or/and the chrominance) for each pixel in every N neighboring pixels in a horizontal scanning line, where N is an integer greater than or equal to 1.

The data set of each pixel in the N neighboring pixels represents one set of data in the digital data stream after the digital data stream is mapped. Namely, the N neighboring pixels have identical brightness data or/and chrominance. In general, a higher value N leads to a higher reliability of forming the composite video signal from the mapped digital data stream. Depending on implementation, the value N is set, for example, 6, 7, 8, 9, and etc.

In one embodiment, each pixel in a scanning line is an X-bit binary sequence representing a data set, and each corresponding set in the digital data stream is a Y-bit binary sequence. The mapping unit maps each set of Y-bit data into high Y bits of the X-bit binary sequence of each pixel in every N neighboring pixels, and further maps a preset X-Y bit binary sequence into low X-Y bits of the X-bit binary sequence of each pixel in every N neighboring pixels, where X and Y are positive integers and Y is less than X, N is greater than or equal to 4, X is greater than or equal to 8, e.g., 8 and 10, and Y is greater than or equal to 2, e.g., 3-5. The preset X-Y bit binary sequence is all 0 or 1, or other predefined X-Y bit binary sequence. The X-bit binary sequences of pixels of every N neighboring pixels are identical with each other after one set of data is mapped.

Thus, through the mapping unit 320, the X-bit brightness data loaded with one set of data from the digital data stream is obtained. Meanwhile, the mapping unit 320 further generates the chrominance data for each pixel of the horizontal scanning line used to synthesize the composite video signal. All the chrominance data is 1 or 0, or the chrominance data is other predefined binary sequence because the chrominance data is not loaded with the digital data stream.

In another embodiment, it is also possible to map the digital data stream provided by the digital data source 310 into the chrominance data by employing the same manner as described above. In this embodiment, the mapping unit 320 can be designed to generate the brightness data of each pixel in the horizontal scanning line used to synthesize the composite video signal. All the brightness data is 1 or 0, or the brightness data is other predefined binary sequence because the brightness data is not loaded with the digital data stream.

The composite video signal encoder 330 is designed to generate a synchronization signal, receive the chrominance data and the brightness data loaded with the digital data stream from the mapping unit 320, and generate an analog composite video signal based on the synchronization signal according to a predetermined composite video format. One exemplary composite video format is a National Television Standards Committee (NTSC) format or a Phase Alternating Line (PAL) format. The composite video signal encoder 330 adopts conventional composite video signal encoding techniques, which will not be described in detail here to avoid obscuring important aspects of the present invention.

The composite video transmission interface 340 adopts a conventional TV-out interface which, for example, is used on a D1/960H analog surveillance camera. The composite video transmission interface 340 is in compliance with a coaxial cable or a transmission line in a conventional standard, and is used to transfer the analog composite video signal out, for example, to a display or a recording device.

One of the benefits, advantages and objects in the present invention is to map a digital data stream into a composite video signal. Based on the digital data stream, the brightness data or/and the chrominance data for pixels in scanning lines are obtained. The composite video signal is synthesized based on the brightness data or/and the chrominance data mapped from the digital data stream. As a result, an existing transmission line such as the coaxial cable can still be used to transmit the digital data stream. In addition, the digital data stream is disguised as the brightness data or the chrominance data which is mapped into the composite video signal in the present invention. Transmission characteristics of the composite video signal CVBS has not been changed. The standard composite video signal CVBS is transmitted in the coaxial cable no matter what data the mapped digital data stream is. Therefore, it is realized that the digital data stream is transmitted on the existing coaxial cable with ordinary quality in a long distance. One use of the present invention is very important for the field of video surveillance. The HD video signal can be now transported over 300 meters efficiently by using a existing coaxial cable of ordinary quality, e.g., a coaxial cable meeting an international standard RG-59, or a Chinese standard 75-3, etc., without any change to the conventional analog SD transmission path.

As an example, it is assumed that X=8, Y=4, N=9, and the composite video signal is in PAL format (575 scanning lines, 25 frames per second). X=8 means that the brightness data of each pixel of a horizontal scanning line is an 8-bit binary sequence, Y=4 means that a set of 4 bit data in the digital data stream is mapped into the high 4 bits of the 8-bit binary sequence of one pixel in a horizontal scanning line, and N=9 means that every 9 pixels is mapped with one set of 4 bit data. For example, if each horizontal scanning line has 720 pixels, each set of 4-bit data of the digital data stream is mapped into the high 4 bits of the brightness data of each pixel of every 9 neighboring pixels, and thus the 720 pixels of each horizontal scanning line are mapped with 80 (720/9) sets of 4-bit data, i.e., 320 bits data in total.

Figure 4:
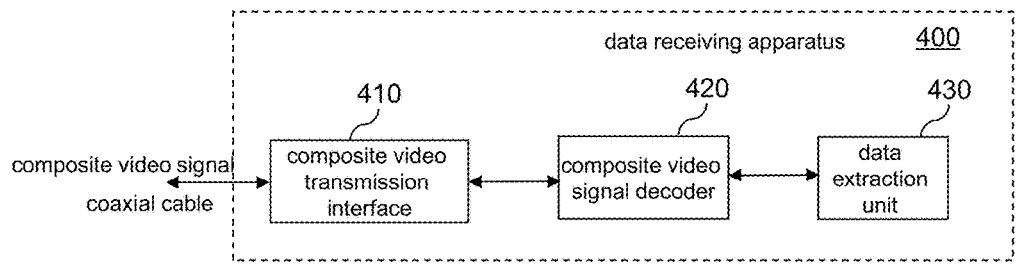
FIG. 4 is a block diagram showing a data receiving apparatus according to one embodiment of the present invention.

Referring now to FIG. 4, it is a block diagram showing a data receiving apparatus 400 according to one embodiment of the present invention. The data receiving apparatus 400 is designed to receive an analog composite video signal sent from the data transmitting apparatus 300 and obtain the digital data stream loaded into the analog composite video signal in the data transmitting apparatus 300. As shown in FIG. 4, the data receiving apparatus 400 includes a composite video transmission interface 410, a composite video signal decoder 420 and a data extraction unit 430.

The composite video transmission interface 410 is designed to receive the analog composite video signal from the data transmitting apparatus 300. The interface 410 adopts a TV-out interface which is used in a common analog surveillance camera. The TV-out interface is connected with a coaxial cable to receive the analog composite video signal transported via the coaxial cable.

The composite video signal decoder 420 is designed to decode the analog composite video signal according to a predetermined composite video format to obtain the embedded video data. The predetermined composite video format may be in NTSC format or a PAL format. Specifically, the video data obtained by the composite video signal decoder 420 includes a synchronization signal, a plurality of horizontal scanning lines, each line includes a plurality of pixels, where each pixel represents a set of brightness data or/and chrominance data. The composite video signal decoder 420 adopts a conventional composite video signal decoding technique, which will not be described in detail here to avoid obscuring important aspects of the present invention.

The data extraction unit 430 extracts the digital data stream mapped into the brightness data or/and the chrominance data from the brightness data or/and the chrominance data of pixels of the horizontal scanning lines. The brightness data and the chrominance data are collectively called as the video data. The extracted digital data stream is one or more of a video signal, an audio signal, a control signal, and a surveillance alarm signal.

In one embodiment, that the digital data stream mapped into the brightness data is extracted from the brightness data of the pixels in the horizontal scanning lines is taken as an example. The principle of extracting the digital data stream mapped into the chrominance data from the chrominance data is omitted here for simplicity because it is identical with extracting the digital data stream mapped into the brightness data from the brightness data. Preferably, the data extraction unit 430 extracts a set of data of the digital data stream from the brightness data or/and the chrominance data of every N neighboring pixels in a horizontal scanning line. Thus, the data extraction unit 430 extracts a plurality of data sets of the digital data stream from the brightness data or/and the chrominance data of the horizontal scanning line.

In one embodiment, each pixel of the horizontal scanning line comprises an X-bit binary sequence representing the brightness data, and each data set of the digital data stream is a Y-bit binary sequence. The data extraction unit 430 extracts a set of Y-bit data of the digital data stream from the high Y bits in the X-bit binary sequences of the N neighboring pixels. The data extraction unit 430 discards low X-Y bits in the X-bit binary sequences of the N neighboring pixels if a preset X-Y bits binary sequence is mapped into the low X-Y bits in the X-bit binary sequence of each pixel of the N neighboring pixels at the data transmitting apparatus. In addition, the chrominance data of each pixel is also discarded directly in the data receiving apparatus 400 because the chrominance data is not loaded with the digital data stream.

In one embodiment, the data receiving apparatus 400 further comprises a video decompression unit provided to decompress the digital data stream extracted by the data extraction unit 430 according to a predetermined decompressing standard, e.g., H.264, MPEG2, H.265, etc., to obtain digital video source data. The digital video source data is in an HD format, and thus the data receiving apparatus 400 realizes to recover the digital video source data in the HD format.

It can be seen that the digital data stream mapped in the analog composite video signal is effectively recovered in the data receiving apparatus 400. Thus, the digital data stream is transmitted via the conventional coaxial cable by being mapped into the composite video signal.

The data transmitting apparatus 300 and the data receiving apparatus 400 in the present invention are two operationally opposite devices. The former can be also referred to as data transmitting side or end, the latter can be referred to as the data receiving side or end. They are collectively called as a data transmission system which is designed to collectively achieve a transmission of the digital data stream based on the composite video signal.

Figure 5:
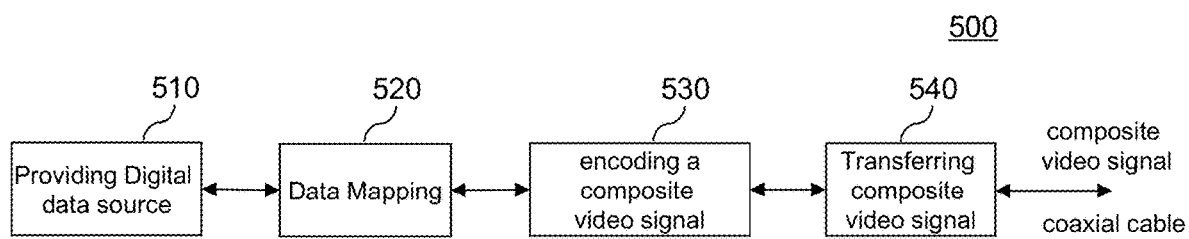
FIG. 5 is a flow chart showing a method for transmitting data according to one embodiment of the present invention.

The data transmission scheme in the present invention also can be implemented as a method. FIG. 5 is a flowchart showing a data transmitting method 500 according to one embodiment of the present invention. As shown in FIG. 5, the data transmitting method 500 includes following operations.

At 510, a digital data source is provided to generate a digital data stream. The digital data stream is one or more of a video signal, an audio signal, a control signal, and a surveillance alarm signal. In one embodiment, providing the digital data source 510 comprises: taking pictures of a scene to obtain a digital video source; and compressing the digital video source according to a video compressing standard such as H.263, MPEG2, H.265, etc., to obtain compressed digital video data, which can be viewed as a digital data stream provided by the digital data source. More preferably, the digital video source is in an HD format which has a video vertical resolution of 720p and more, for example, 720p, 1080i, 1080p, and etc. Thus, the data transmitting method 500 supports acquisition and transmission of the digital video source data in the HD format.

At 520, the digital data stream provided by the digital data source is mapped into brightness data or chrominance data used to synthesize a composite video signal, wherein the brightness data and the chrominance data are called as a video data set. The digital data stream provided by the digital data source is packaged into a plurality of data sets. The video data used to synthesize the composite video signal comprises horizontal scanning lines, each horizontal scanning line having a plurality of pixels. Each pixel represents the brightness data or/and the chrominance data.

Mapping each data set of the digital data stream into the brightness data used to synthesize the composite video signal is taken as an example. The principle of mapping each data set of the digital data stream into the chrominance data used to synthesize the composite video signal is omitted here for simplicity because it is substantially similar to mapping each data set of the digital data stream into the brightness data used to synthesize the composite video signal.

At 520, each data set of the digital data stream provided by the digital data source is mapped into the brightness data of each pixel of every group of N neighboring pixels in the horizontal scanning lines, wherein N is an integer greater than or equal to 1. Each pixel of the horizontal scanning lines comprises an X-bit binary sequence, and each data set of the digital data stream is a Y-bit binary sequence. In one specific embodiment, at 520, each set of Y-bit binary sequence in the digital data stream provided by the digital data source is mapped into high Y bits in the X-bit binary sequence of each pixel in a group of N neighboring pixels in a horizontal scanning line, and a preset X-Y bit binary sequence is mapped into the lower X-Y bits of the X-bit binary sequence of each pixel in the group of N neighboring pixels in the horizontal scanning lines used to synthesize the composite video signal.

Additionally, at 520, the chrominance data used to synthesize the composite video signal and a synchronization signal are generated according to a predefined rule if the digital data stream provided by the digital data source is mapped into the brightness data used to synthesize the composite video signal.

At 530, the synchronization signal, the chrominance data and the brightness data are synthesized to form an analog composite video signal according to a predetermined composite video format, such as an NTSC format, a PAL format or other format.

At 540, the analog composite video signal is transmitted via a coaxial cable. In this embodiment, the values of X, Y, and N may be referred to the values in the data transmitting apparatus 300 described above, and some other details may also be referred to the related description about the data transmitting apparatus 300.

Figure 6:
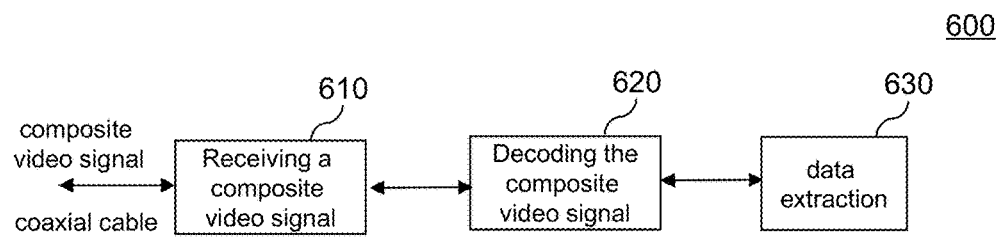
FIG. 6 is a flow chart showing a method for receiving data according to one embodiment of the present invention.

FIG. 6 shows a flowchart of data receiving method 600 according to one embodiment of the present invention. The data receiving method 600 is used to receive the composite video signal sent by the data transmitting method 500 and obtain the digital data stream loaded into the composite video signal in the data transmitting method 500. The data receiving method 600 comprises following operations.

At 610, an analog composite video signal is received via a coaxial cable. At 620, the analog composite video signal is decoded according to a predetermined composite video format to obtain the video data. The predetermined composite video format is in NTSC format or PAL format.

Specifically, at 620, the video data includes a synchronization signal, a plurality of horizontal scanning lines, each horizontal scanning line includes a plurality of pixels, where each pixel represents the brightness data or/and the chrominance data. The composite video signal decoder 420 adopts a conventional composite video signal decoding technique, which will not be described in detail to avoid obscuring the important aspect of the present invention.

At 630, a digital data stream mapped into the video data is extracted from the video data, wherein the extracted digital data stream is one or more of a video signal, an audio signal, a control signal and a surveillance alarm signal. In operation, a data set in the digital data stream is extracted from the brightness data or/and the chrominance data of each group of N neighboring pixels in the horizontal scanning lines. If the digital data stream is mapped into the brightness data at the data transmitting side, the digital data stream is extracted from the brightness data. If the digital data stream is mapped into the chrominance data at the data receiving side, the digital data stream is extracted from the chrominance data.

That the digital data stream is mapped into the brightness data is taken as an example. Each pixel in the horizontal scanning lines comprises an X-bit binary sequence representing the brightness data and each set of data of the digital data stream is a Y-bit binary sequence. More specifically, at 630, a set of Y-bit data of the digital data stream is extracted from high Y bits of the X-bit binary sequences of every N neighboring pixels of the horizontal scanning lines. The low X-Y bits of the X-bit binary sequences of every N neighboring pixels is discarded because a preset X-Y bits binary sequence is mapped into the low X-Y bits of the X-bit binary sequence of each pixel of every N neighboring pixels at the data transmitting side. In addition, the chrominance data of each pixel of the horizontal scanning line is also discarded directly because the chrominance data is not loaded with the digital data stream.

In a preferred embodiment, the data receiving method 600 further comprises an operation of decompressing the extracted digital data stream according to a predetermined decompressing standard, e.g., H.264, MPEG2, H.265, etc., to obtain the digital video source data. The digital video source data is a signal in HD format. Thus, the data receiving method 600 is provided to recover the digital video source data in HD format.

The data transmitting method 500 corresponds to the data receiving method 600 in the present invention. The composite video signal sent by the method 500 is received and decoded by the method 600. They are collectively called as a data transmission method which together realizes the transmission of the digital data stream based on the composite video signal.

In this embodiment, the values of X, Y, and N are referred to the values in the data receiving apparatus 400 described above, and some other details may also be referred to the related description in the data receiving apparatus 400. In an application scenario, the data transmitting apparatus 300 is an HD video camera of the video surveillance system, and the data receiving apparatus 400 is a video receiving device of the video surveillance system. Both the HD video camera and the video receiving device are connected with a conventional coaxial cable via TV-out interfaces thereof respectively. A connection mode of the HD video camera and the video receiving device is plug-and-play. The data transmitting apparatus 300 and the data receiving apparatus 400 support the transmission of an analog signal in NTSC/PAL/960H format adopted by conventional analog video surveillances. Therefore, in this application scenario, the coaxial cable is a cable already laid in the video surveillance system with a low resolution, such as SD, and does not need to be updated or replaced. In other words, the video surveillance system in the present invention can use the existing coaxial cables to transmit HD digital video data, and be compatible with the conventional video surveillance system.

The data transmission system provided in the present invention not only can transmit the analog composite video signal with a standard resolution in the NTSC/PAL/960H format as before, but also can transmit the HD digital video data such as 720p and 1080p by loading the HD digital video data into the analog composite video signal. In one embodiment, a video capture unit of the HD video camera takes pictures of a scene to obtain a HD digital video source data, and then a video compression unit of the HD video camera compresses the HD digital video source data according to a compressing standard, e.g., H.264, to obtain the compressed HD digital video data. A mapping unit of the HD video camera maps the compressed HD digital video data into the video data such as the brightness data used to synthesize the composite video signal. A composite video signal encoder of the HD video camera receives the video data from the mapping unit, and generates an analog composite video signal based on the video data used to synthesize the composite video signal according to a predetermined composite video format, e.g., the PAL format or the NTSC format. The analog composite video signal is outputted via the TV-out interface of the HD video camera.

The analog composite video signal in the NTSC/PAL format is transmitted, but the HD digital video source data embedded in the analog composite video signal can be recovered. For example, a frame frequency of the PAL format is 25 frames per second and each frame comprises 575 effective horizontal scanning lines. Each horizontal line of the analog composite video signal is an analog waveform that can be considered as a continuous stream of pulse amplitude modulation (PAM) waveforms. From the analog waveforms, a sequence of digital data (PCM) can be recovered. As another specific implementation, a quadrature amplitude modulation (QAM modulation), e.g., QAM16, QAM64, QAM128, QAM256, etc., can also be used in the present invention.

The video receiving device of the present invention receives the analog composite video signal transmitted on the coaxial cable via a TV-out interface thereof, and decodes the analog composite video signal according to a predetermined composite video format to obtain the video data. A data extraction unit extracts the compressed HD digital video data from the video data. In a preferred scheme, the data extraction unit extracts the compressed HD digital video data from the brightness data in the video data. Afterwards, the compressed HD digital video data is decompressed according to a predetermined decompressing standard to obtain a HD digital video source data. Hence, the transmission of the digital video signal is achieved via a conventional composite video transmission channel.

In one embodiment, to reliably recover the PCM digital data from the analog waveform, a symbol rate requires to be reduced by a factor of N, e.g., 8, 9 or more. The symbol rate is reduced by mapping a Y-bit data set of the HD digital video data into the brightness data or the chrominance data of each pixel of in a group including N neighboring pixels at the video signal transmitting side, and sampling a Y-bit data set from the brightness data or the chrominance data of each of N neighboring pixels in the video signal receiving side, wherein the number of pixels in each horizontal scanning line is divisible by N. In one embodiment, N may be greater than or equal to 4, e.g. N is 9. If the horizontal scanning line has 720 pixels, the compressed HD digital video data is mapped into the brightness data or the chrominance data of every 9 pixels of the horizontal scanning line, and about 80 sets of data, i.e., 320 bits of data totally if Y=4 are recovered for each horizontal scanning line.

Provided that X=8, the mapping unit maps the compressed HD digital video data into high 3 bits, 4 bits, 5 bits or more of the 8-bit brightness data at the vide signal transmitting side to reliably recover the PCM digital data from the analog waveform. Accordingly, the data extraction unit extracts the high 3 bits, 4 bits or more of the 8-bit brightness data of each pixel as the compressed HD digital video data. The lower Y is, the higher the reliability to recover the PCM digital data is. In the PAL format, provided that Y=4, N=9, and each horizontal scanning line has 720 pixels, a transmission data rate is 575*25*4*720/9=4.6 Mbit/s. If each horizontal scanning line has 960 pixels, the transmission data rate is 575*25*4*960/9=6.1 Mbit/s. It can be seen that a bandwidth of the video surveillance system in the NTSC/PAL format can fully support transmission of the HD digital video data in the present invention.

An HD camera that may be used in the present invention may a network camera in the prior art. The video receiving device of the present invention may be a DVR or NVR in the prior art. Those skilled people in the art may develop new devices, or add a new software or hardware module into the existing camera or devices to get the HD camera and the video receiving device.

For example, an existing network camera and a DVR box are employed. It is only needed to add a software module or a hardware module configured for mapping the compressed HD digital video data compressed by the network camera into a composite video signal in the network camera. Likewise, a software module or a hardware module is added into the DVR box to extract the compressed HD digital video data from the video data and decompress the compressed HD digital video data. This system contemplated in the present invention is not only compatible with an analog camera with standard resolution and but also compatible with a digital camera with a high resolution with relatively low cost.

In one embodiment, an NVR is adopted to replace the above mentioned DVR. A composite video decoder can be added into the NVR. The composite video decoder is a chip used to transforming an NTSC/PAL signal into a digital video data. Thus, the NVR can act as a conventional DVR for use, since the NVR does not need to perform any compression operation, and the NVR is generally cheaper than the DVR.

As appreciated by those skilled in the art, a standard composite video decoding chip can be used in the present invention. In other words, the DVR with a standard resolution in the present invention can be directly used for transmission of a HD digital video data.

The method and the apparatus for data transmission of the present invention can meet all the requirements listed hereafter:

1) supporting a high-resolution camera (e.g., 720p, 1080p or higher);

2) Transmission over long distances (e.g. over 300 meter or longer) based on existing coax cables (e.g. RG-59 internationally and 75-3 in China) without having to add repeaters;

3) easy to install and no network management and requires no network administrator;

4) backward compatible with CCTV cameras; and 5) cost effective.

Moreover, the method or apparatus for data transmission in the present invention has very low implementation cost and backward compatibility, and may be directly used in many existing NTSC/PAL systems. Each digital camera in the video surveillance system of the present invention only having one channel to transmit its own video stream will has enough bandwidth e.g. a rate of 4-5 Mbps to support transmission of 720P, 1080P or higher.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. An apparatus for transmitting data via an analog composite video signal, the apparatus comprising:
   a mapping unit receiving a digital data stream including video data provided by a digital data source and converting the video data to brightness data and chrominance data;
   a composite video signal encoder receiving the chrominance data and the brightness data and forming the analog composite video signal from the chrominance data and the brightness data according to a predetermined composite video format; and
   a composite video transmission interface for sending the analog composite video signal over a conventional transmission medium suitable for transmitting the composite video signal.

2. The apparatus according to claim 1, wherein the digital data stream provided by the digital data source is in HD format.

3. The apparatus according to claim 2, wherein the digital data stream provided by the digital data source is packaged into a plurality of data sets, the video data includes a plurality of horizontal scanning lines, each horizontal scanning line including a plurality of pixels, where each pixel represents the brightness data or/and the chrominance data, and each data set of the digital data stream is mapped into the brightness data or/and the chrominance data of a pixel in a group having N neighboring pixels in a horizontal scanning line, wherein N is an integer greater than or equal to 1.

4. The apparatus according to claim 3, wherein each of the pixels is represented by an X-bit binary sequence representing the brightness data or/and the chrominance data, and each data set of the digital data stream is a Y-bit binary sequence, the mapping unit maps the data set into high Y bits of the X-bit binary sequence, and further maps a preset X-Y bit binary sequence into low X-Y bits of the X-bit binary sequence, wherein X and Y are positive integers, Y is less than X, N is greater than or equal to 4, X is greater than or equal to 8, and Y is greater than or equal to 2.

5. The apparatus according to claim 2, wherein, when the digital data stream is mapped into the brightness data in the video data, the mapping unit generates the chrominance data in the video data according to a predefined rule, or when the digital data stream is mapped into the chrominance data in the video data, the mapping unit generates the brightness data in the video data according to a predefined rule.

6. The apparatus according to claim 5, wherein the composite video signal encoder is configured for generating a synchronization signal, and compositing the synchronization signal, and the chrominance data and the brightness data from the mapping unit to form the composite video signal per the predetermined composite video format, and the composite video transmission interface is coupled to the conventional transmission medium.

7. The apparatus according to claim 6, wherein the conventional transmission medium is a coaxial cable.

8. The apparatus according to claim 1, wherein the digital data stream provided by the digital data source includes one or more of a video signal, an audio signal, a control signal, and a surveillance alarm signal.

9. The apparatus according to claim 1, further comprising:
   a video capturing unit for taking pictures of a scene to obtain digital video source data; and
   a video compression unit for compressing the digital video source data to obtain compressed digital video source data.

10. The apparatus according to claim 9, wherein the digital video source data and the compressed digital video source data both are in high definition format, and the compressed digital video source data in the high definition format is mapped into brightness data or chrominance data in the video data.

11. An apparatus for receiving data transmitted via an analog composite video signal, the apparatus comprising:
    a composite video transmission interface receiving the analog composite video signal from a conventional transmission medium not suitable for transmitting digital video signal in HD format;
    a composite video signal decoder decoding the composite video signal according to a predetermined composite video format to obtain to obtain brightness data and chrominance data so as to form video data; and
    a data extraction unit extracting a digital data stream from the video data and coupled the digital data stream to a data line for transmission.

12. The apparatus according to claim 11, wherein the video data obtained by the composite video signal decoder includes a synchronization signal, a plurality of horizontal scanning lines, each horizontal scanning line having a plurality of pixels, each pixel representing brightness data or/the chrominance data, and the data extraction unit extracts the digital data stream from the brightness data or/and the chrominance data of pixels in the horizontal scanning lines.

13. The apparatus according to claim 10, wherein the data extraction unit extracts a data set of the digital data stream from the brightness data or/and the chrominance data of N neighboring pixels, wherein N is an integer greater than or equal to 1.

14. The apparatus according to claim 13, wherein each pixel is represented by an X-bit binary sequence representing the brightness data or/and the chrominance data, and each data set of the digital data stream is a Y-bit binary sequence, the data extraction unit extracts a Y-bit data set from high Y bits in the X-bit binary sequences of N neighboring pixels, wherein X and Y are positive integers and Y is less than X, N is greater than or equal to 4, X is greater than or equal to 8, and Y is greater than or equal to 2.

15. The apparatus according to claim 11, wherein the digital data stream is one or more of a video signal, an audio signal, a control signal, and a surveillance alarm signal.

16. The apparatus according to claim 10 further comprising:
    a composite video transmission interface for receiving the composite video signal via a coaxial cable;
    a composite video signal decoder for decoding the composite video signal according to a predetermined composite video format to obtain video data;
    a data extraction unit for extracting a digital data stream mapped into the video data from the video data; and a video decompression unit configured for decompressing the digital data stream to obtain digital video source data.

17. The apparatus according to claim 16, wherein the video data obtained by the composite video signal decoder comprises a synchronization signal, a plurality of horizontal scanning lines each horizontal scanning line consisting of a plurality of pixels each pixel representing the brightness data or/and the chrominance data.

18. The apparatus according to claim 17, wherein the data extraction unit extracts the digital data stream from the brightness data or/and the chrominance data of the pixels of the horizontal scanning line, and the digital video source data is in high definition format.

19. A method for transmitting data via a composite video signal, the method comprising:
mapping a digital data stream including video data provided by a digital data source into brightness data and chrominance data;
generating the composite video signal based on the brightness data and chrominance data, wherein the brightness data and chrominance data are used to synthesize the composite video signal according to a predetermined composite video format; and
transferring the composite video signal over a conventional transmission medium suitable for transmitting the composite video signal.

20. The method according to claim 19, wherein the conventional transmission medium is a coaxial cable.

21. The method according to claim 20, wherein the digital data stream provided by the digital data source is in HD format.

22. The method according to claim 21, wherein the digital data stream is packaged into a plurality of data sets, the video data includes a plurality of horizontal scanning lines, each horizontal scanning line including a plurality of pixels, where each pixel represents the brightness data or/and the chrominance data, and each data set of the digital data stream is mapped into the brightness data or/and the chrominance data of a pixel in a group having N neighboring pixels in a horizontal scanning line, wherein N is an integer greater than or equal to 1.

23. The method according to claim 22, wherein each of the pixels is represented by an X-bit binary sequence representing the brightness data or/and the chrominance data, and each data set of the digital data stream is a Y-bit binary sequence, the mapping unit maps the data set into high Y bits of the X-bit binary sequence, and further maps a preset X-Y bit binary sequence into low X-Y bits of the X-bit binary sequence, wherein X and Y are positive integers, Y is less than X, N is greater than or equal to 4, X is greater than or equal to 8, and Y is greater than or equal to 2.

24. The method according to claim 23, wherein, when the digital data stream is mapped into the brightness data in the video data, the mapping unit generates the chrominance data in the video data according to a predefined rule, or when the digital data stream is mapped into the chrominance data in the video data, the mapping unit generates the brightness data in the video data according to a predefined rule.

25. The method according to claim 19, wherein the conventional transmission medium is a coaxial cable.

26. A method for receiving data transmitted via a composite video signal, the method comprising:
receiving the composite video signal from a conventional transmission medium not suitable for transmitting digital video signal in HD format;
decoding the composite video signal to obtain brightness data and chrominance data according to a predetermined composite video format; and
extracting from video data from the brightness data and chrominance data to form a digital data stream, wherein the digital data stream is coupled into a transmission medium suitable for transmitting data stream.

27. The method according to claim 26, wherein the video data includes a synchronization signal, a plurality of horizontal scanning lines, each horizontal scanning line having a plurality of pixels: each pixel representing brightness data or/the chrominance data, and the data extraction unit extracts the digital data stream from the brightness data or/and the chrominance data of pixels in the horizontal scanning lines.

28. The method according to claim 27, wherein a data set of the digital data stream is extracted from the brightness data or/and the chrominance data of N neighboring pixels, wherein N is an integer greater than or equal to 1.

29. The method according to claim 28, wherein each pixel is represented by an X-bit binary sequence representing the brightness data or/and the chrominance data, and each data set of the digital data stream is a Y-bit binary sequence, the data extraction unit extracts a Y-bit data set from high Y bits in the X-bit binary sequences of N neighboring pixels, wherein X and Y are positive integers and Y is less than X, N is greater than or equal to 4, X is greater than or equal to 8, and Y is greater than or equal to 2.

30. The method according to claim 29, wherein the digital data stream is one or more of a video signal, an audio signal, a control signal, and a surveillance alarm signal.

* * * * *